(12) United States Patent
Goodall et al.

(10) Patent No.: US 11,947,838 B2
(45) Date of Patent: Apr. 2, 2024

(54) UTILIZING STATUSES TO PRESERVE A STATE OF DATA DURING PROCEDURES SUCH AS TESTING WITHOUT CAUSING FUNCTIONAL INTERRUPTIONS

(71) Applicant: International Business Machines Corporation, Armonk, NY (US)

(72) Inventors: Lourie Goodall, Tucson, AZ (US); Joseph M. Swingler, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 17/107,607

(22) Filed: Nov. 30, 2020

(65) Prior Publication Data
US 2022/0171568 A1 Jun. 2, 2022

(51) Int. Cl.
*G06F 3/06* (2006.01)
(52) U.S. Cl.
CPC .......... *G06F 3/0659* (2013.01); *G06F 3/0604* (2013.01); *G06F 3/0619* (2013.01); *G06F 3/0634* (2013.01); *G06F 3/067* (2013.01)
(58) Field of Classification Search
CPC ...... G06F 3/0604; G06F 3/0619; G06F 3/067; G06F 3/0634; G06F 3/0659
See application file for complete search history.

(56) References Cited

U.S. PATENT DOCUMENTS

| | | | |
|---|---|---|---|
| 7,962,709 B2 | 6/2011 | Agrawal | |
| 9,569,314 B2 | 2/2017 | Iwasaki et al. | |
| 9,645,839 B2 | 5/2017 | Jacobson et al. | |
| 10,073,633 B2* | 9/2018 | Tsao | .......... G06F 3/064 |
| 10,310,953 B2 | 6/2019 | Vijayan et al. | |
| 10,540,247 B2 | 1/2020 | Kazi | |
| 2013/0282919 A1* | 10/2013 | Richards, III | ...... H04L 67/1097 709/238 |
| 2014/0006351 A1* | 1/2014 | Laitkorpi | .............. G06F 16/184 707/634 |
| 2014/0173035 A1* | 6/2014 | Kan | ...................... G06F 3/0617 709/217 |

(Continued)

OTHER PUBLICATIONS

DELL Technologies, "Dell EMC PowerMax and VMAX All Flash: TimeFinder SnapVX Local Replication," DELL Technologies, Technical White Paper, Oct. 2020, 66 pages.

(Continued)

*Primary Examiner* — Mark A Giardino, Jr.
(74) *Attorney, Agent, or Firm* — Zilka-Kotab, P.C.

(57) ABSTRACT

A computer-implemented method according to one approach includes receiving requests to perform data operations on a first storage container, where the data operations include a read operation and a write operation. It is determined whether first data stored on the first storage container is set to a read-only status. In response to determining that the first data is set to the read-only status, the read operation is allowed to be performed on the first container for reading the first data, and the write operation is performed on a second storage container. Moreover, in response to determining that the first data is set to the read-only status, it is determined whether the read-only status has been withdrawn. In response to determining that the read-only status has been withdrawn, further write operations are allowed to be performed on the first storage container.

25 Claims, 10 Drawing Sheets

(56) References Cited

U.S. PATENT DOCUMENTS

| | | | | |
|---|---|---|---|---|
| 2014/0331082 | A1* | 11/2014 | Singh | G06F 11/1469 |
| | | | | 714/6.22 |
| 2015/0355613 | A1* | 12/2015 | Palmer | H04L 12/2816 |
| | | | | 700/275 |
| 2016/0342465 | A1* | 11/2016 | Cudak | G06F 11/1068 |
| 2016/0378685 | A1* | 12/2016 | Spurlock | G06F 21/6218 |
| | | | | 711/163 |
| 2017/0003900 | A1* | 1/2017 | Falco | G06F 3/067 |
| 2020/0319825 | A1* | 10/2020 | Chu | G06F 3/0604 |
| 2021/0011880 | A1* | 1/2021 | Marelas | G06F 16/113 |

OTHER PUBLICATIONS

Grace Period Disclosure, Goodall et al., "Cloud Storage Tier Export, Recovery and Testing," IBM, Document Version 1.0, Section 7, Sep. 28, 2020, 64 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

* cited by examiner

550

Initial Catalog

| Data | Version | Location | Delete |
|---|---|---|---|
| Data1 | v1 | Container1 | No |
| Data2 | v1 | Container1 | No |
| Data3 | v1 | Container1 | No |

| Container | VaultState | Redirect Container |
|---|---|---|
| 1 | READ-ONLY | Container2 |
| 2 | READ-WRITE | - |

Updated Catalog

| Data | Version | Location | Delete |
|---|---|---|---|
| Data1 | v1 | Container1 | No |
|  | v2 | Container2 | No |
| Data2 | v1 | Container1 | No |
| Data3 | v1 | Container1 | No |

Final Catalog

| Data | Version | Location | Delete |
|---|---|---|---|
| Data1 | v1 | Container1 | No |
|  | v2 | Container2 | No |
| Data2 | v1 | Container1 | No |
| Data3 | v1 | Container1 | Yes |
| Data7 | v1 | Container2 | No |

| Container | ContainerState | Redirect Container | Active day |
|---|---|---|---|
| 606 | READ-ONLY | 608 | Monday |
| 608 | READ-ONLY | 610 | Tuesday |
| 610 | READ-WRITE | - | Wednesday |
| 612 | READ-ONLY | 614 | Thursday |
| 614 | READ-ONLY | 616 | Friday |
| 616 | READ-ONLY | 618 | Saturday |
| 618 | READ-ONLY | 606 | Sunday |

FIG. 6B

UTILIZING STATUSES TO PRESERVE A STATE OF DATA DURING PROCEDURES SUCH AS TESTING WITHOUT CAUSING FUNCTIONAL INTERRUPTIONS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): "CLOUD STORAGE TIER EXPORT, RECOVERY AND TESTING," Lourie Goodall, Joe Swingler and Takahiro Tsuda, Sep. 28, 2020, see especially pp. 43-48.

BACKGROUND

The present invention relates to storage devices, and more particularly, this invention relates to preserving data in storage systems and networks during procedures such as testing while also redirecting modifying data operations to a designated storage container.

Cloud storage is a model of data storage in which the digital data is stored in logical pools which correspond to physical storage. The physical storage spans multiple servers, and the physical environment is typically managed by a host, e.g., cloud storage provider. These cloud storage providers are responsible for keeping the data available and accessible, and the physical environment protected and functional. People and organizations buy or lease storage capacity from the providers to store user, organization, or application data. It follows that cloud storage can be implemented in conjunction with on premise data storage configurations in order to achieve a distributed data storage system.

Utilizing cloud storage devices as a long-term storage system has become considerably popular over the years. Typically, data stored on cloud storage devices is infrequently accessed, or only accessed subsequent to a disaster occurring. A majority of disaster recovery (DR) strategies include the ability to test the DR plan to ensure the plan works. During such testing, users expect to see realistic DR testing, which includes testing against a user's actual storage device and alongside the user's actual data. Achieving such a testing scenario can be a challenging task because keeping the user's real production data safe during such testing is imperative.

Some devices that offer a DR testing strategy include measures of keeping the production data safe. One such measure includes performing a snapshot, e.g., a point-in-time snapshot copy of an entire logical volume or an entire data set of the device, of the production data, and using the snapshot of the data for DR testing. Utilizing a snapshot serves as a relatively efficient technique for performing DR testing in some data storage systems, however, for several reasons, this is not the case in cloud based storage systems. For example, enabling snapshots of a set of data on a cloud storage system may be time consuming and costly. There are several types of cloud storage systems that offer a variety of pay options. Some of these systems provide inexpensive storage for imports but charge for exporting the data. Other systems schedule payments based on storage space and some according to transactions. Yet, others may offer temporary storage options at a relatively lower cost. Enabling snapshots to be performed in a cloud storage device as a DR test strategy also adds to the complexity of cleaning up the test data once DR testing is complete. This is because users are forced to access the cloud storage device directly to clean up the test data manually, which introduces security risks and the potential for mistakes.

There are several other scenarios in which there is a need to preserve all data in a cloud storage vault. For example, a judicial court may order that a legal hold be placed on data in a cloud storage vault, e.g., in order to preserve the data for discovery purposes. Preventing delete and/or modification type transactions on a system in view of such a legal hold is an extremely difficult process, and trying to preserve data while continuing normal business operation is an even more monumental process.

Accordingly, conventional cloud based data storage lacks solutions to preserve data without causing business interruptions, as well as a safe yet relatively affordable mechanism for performing DR testing.

BRIEF SUMMARY

A computer-implemented method according to one approach includes receiving requests to perform data operations on a first storage container, where the data operations include a read operation and a write operation. It is determined whether first data stored on the first storage container is set to a read-only status. In response to determining that the first data is set to the read-only status, the read operation is allowed to be performed on the first container for reading the first data, and the write operation is performed on a second storage container. Moreover, in response to determining that the first data is set to the read-only status, it is determined whether the read-only status has been withdrawn. In response to determining that the read-only status has been withdrawn, further write operations are allowed to be performed on the first storage container. A state of the first data is preserved while the read-only status is enabled, as read-based operations performed on the first data do not modify the state of the first data. The preserved state of the first data is thereby made available for a testing system that is subject to the read-only status of the first data. Additionally, business interruptions are advantageously not experienced on production system(s) that are not subjected to the read-only status of the first data, and therefore the approach allows production systems to continue to operate in the background while testing is performed on the first data. For example, while the first data is set to the read-only status, the write operation of the data operations that is intended for the first storage container is either postponed or redirected to the second storage container.

DR testing is optionally performed on the first data while the first data is set to the read-only status, and the read-only status is set for a period that disaster recovery testing is being performed on the first data. The read-only status may additionally and/or alternatively optionally be set in order to comply with an instruction to preserve a current state of the first data. Accordingly, a redirection of non-read data operations, such as the write container, to the second storage container while the first data is set to the read-only status is applicable to a variety of scenarios during which a state of the first data is to be maintained for inspection, such as a legal hold of the first data, an auditing of the first storage container, etc.

A computer program product according to another approach includes a computer readable storage medium having program instructions embodied therewith. The program instructions are readable and/or executable by a controller to cause the controller to perform the foregoing method.

A system according to another approach includes a processor, and logic integrated with the processor, executable by the processor, or integrated with and executable by the processor. The logic is configured to perform the foregoing method.

A computer-implemented method according to another approach includes receiving requests to perform data operations on a first storage container. It is determined whether the first storage container is set to a read-only status. In response to determining that the first storage container is not set to the read-only status, read operations are allowed to be performed on data on the first storage container, write operations are allowed to be performed on the data on the first storage container and delete operations are allowed to be performed on the data on the first storage container. In response to determining that the first storage container is set to the read-only status, read operations are allowed to be performed on the data on the first storage container. Moreover, in response to determining that the first storage container is set to the read-only status, write operations are performed on a second storage container that is set to a read-write status. The write operations performed on the second storage container include write operations intended for the first storage container, and write operations intended for a third storage container. As a result, of the write operations intended for the first storage container and the write operations intended for the third storage container being redirected to the second storage container, data of the first storage container and data of the third storage container is protected from being modified until the respective storage container is set from the read-only status to the read-write status. Testing, such as DR testing, is able to be performed on the preserved state of the data of each of the storage containers set to the read-only status. Such testing is enabled without interrupting the workload of a production system, because the write operations of the first storage container and the write operations of the third storage container are redirected to the second storage container which is set to the read-write status.

Write operations intended for the first storage container being redirected to be performed on the second storage container while the first storage container is set to the read-only status is optionally based on a management property of the first storage container and a management property of the third storage container. More specifically, the management property of the first storage container optionally specifies that write operations intended for the first storage container be redirected to the third storage container while the first data set is set to the read-only status, and the management property of the third storage container optionally specifies that write operations intended for the third storage container be redirected to the second storage container while the third storage container is set to the read-only status. A cascading redirection is optionally established based on these management properties, as write operations intended for the first storage container are redirected to the second storage container by the third storage container. By optionally incorporating a rotation to the assignment of the storage container that is set to the read-write status, an air gap copy is established between the different redirection sessions. The air gap copy advantageously adds a degree of safekeeping within the data storage process, because non-read data operations are split across a plurality of storage containers. Accordingly, multiple storage containers are relied upon rather than a single storage container that could otherwise fail.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 5B illustrates a state of a catalog of the data storage architecture in FIG. 5A.

FIG. 5C illustrates a state of a catalog of the data storage architecture in FIG. 5A.

FIG. 5D illustrates a state of a catalog of the data storage architecture in FIG. 5A.

FIG. 6B illustrates a state of a catalog of the data storage architecture in FIG. 6A.

DETAILED DESCRIPTION

Figure 1:
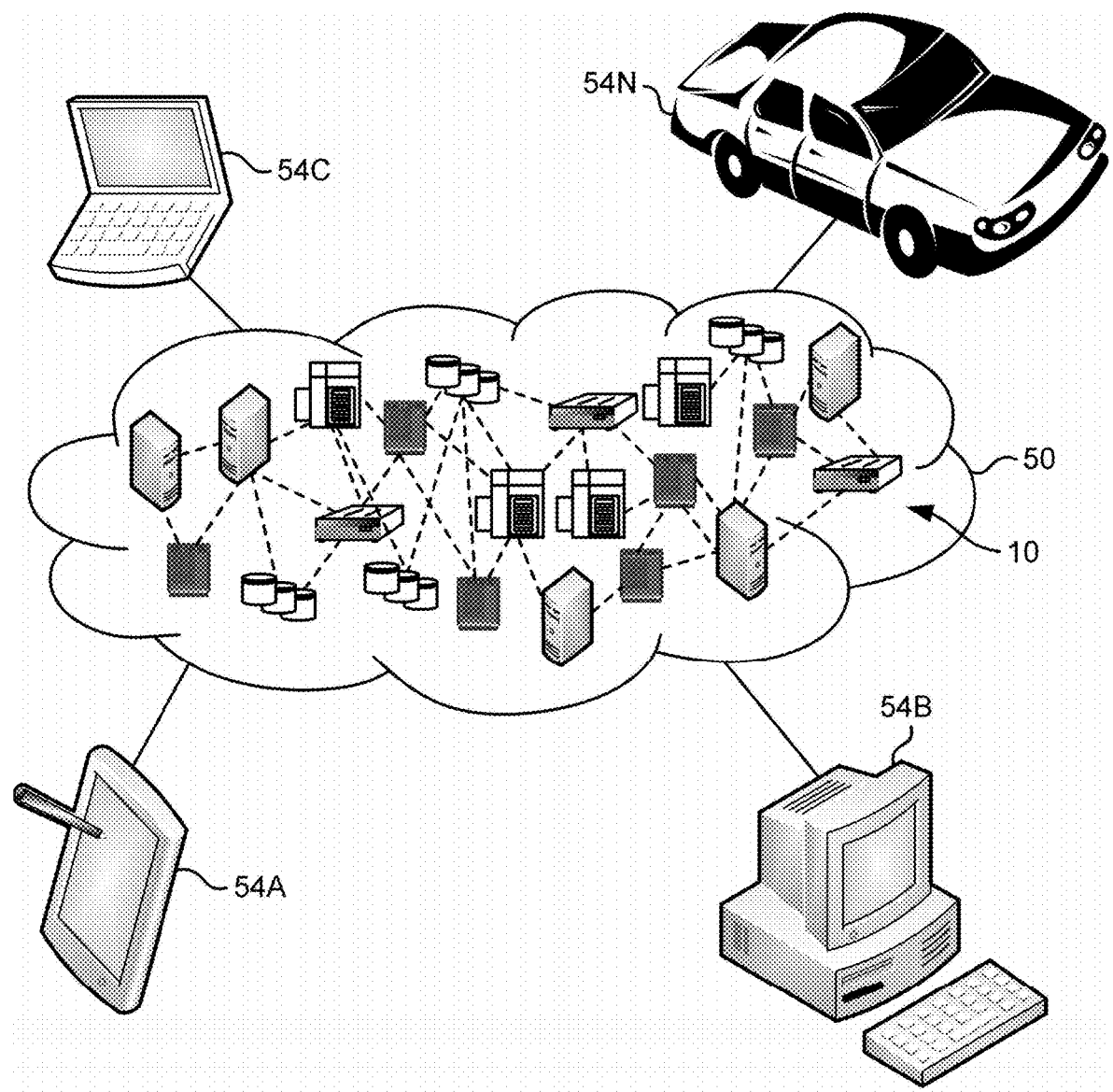
FIG. 1 depicts a cloud computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several approaches of utilizing statuses to preserve data in cloud storage systems and networks during procedures such as testing while also redirecting modifying data operations.

In one general approach, a computer-implemented method includes receiving requests to perform data operations on a first storage container, where the data operations include a read operation and a write operation. It is determined whether first data stored on the first storage container is set to a read-only status. In response to determining that the first data is set to the read-only status, the read operation is allowed to be performed on the first container for reading the first data, and the write operation is performed on a second storage container. Moreover, in response to determining that the first data is set to the read-only status, it is determined whether the read-only status has been withdrawn. In response to determining that the read-only status has been withdrawn, further write operations are allowed to be performed on the first storage container.

In another general approach, a computer program product includes a computer readable storage medium having program instructions embodied therewith. The program instructions are readable and/or executable by a controller to cause the controller to perform the foregoing method.

In another general approach, a system includes a processor, and logic integrated with the processor, executable by the processor, or integrated with and executable by the processor. The logic is configured to perform the foregoing method.

In another general approach, a computer-implemented method includes receiving requests to perform data operations on a first storage container. It is determined whether the first storage container is set to a read-only status. In response to determining that the first storage container is not set to the read-only status, read operations are allowed to be performed on data on the first storage container, write operations are allowed to be performed on the data on the first storage container and delete operations are allowed to be performed on the data on the first storage container. In response to determining that the first storage container is set to the read-only status, read operations are allowed to be performed on the data on the first storage container. Moreover, in response to determining that the first storage container is set to the read-only status, write operations are performed on a second storage container that is set to a read-write status. The write operations performed on the second storage container include write operations intended for the first storage container, and write operations intended for a third storage container.

It is to be understood that although this disclosure includes a detailed description on cloud computing, implementation of the teachings recited herein are not limited to a cloud computing environment. Rather, approaches of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
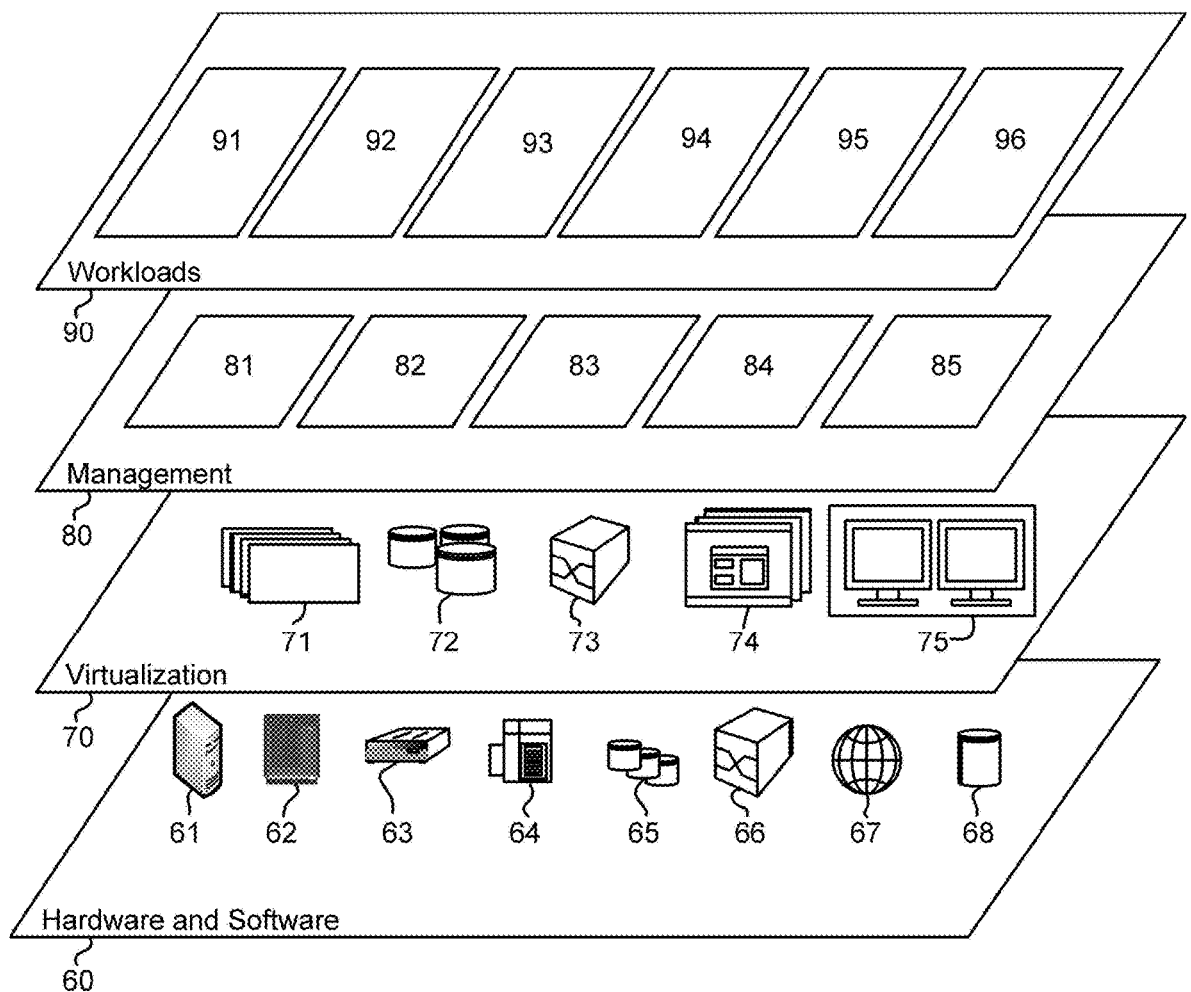
FIG. 2 depicts abstraction model layers, in accordance with one approach.

Referring now to FIG. 2, a set of functional abstraction layers provided by cloud computing environment 50 (FIG. 1) is shown. It should be understood in advance that the components, layers, and functions shown in FIG. 2 are intended to be illustrative only and approaches of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some approaches, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and status utilization to preserve a state of data during procedures such as testing without causing functional interruptions 96.

As described elsewhere above, utilizing cloud storage devices as a long-term storage system has become considerably popular over the years. Typically, data stored on cloud storage devices is infrequently accessed, or only accessed subsequent to a disaster occurring. A majority of disaster recovery (DR) strategies include the ability to test the DR plan to ensure the plan works. During such testing, users expect to see realistic DR testing, which includes testing against a user's actual storage device and alongside the user's actual data. Achieving such a testing scenario can be a challenging task because keeping the user's real production data safe during such testing is imperative.

Some devices that offer a DR testing strategy include measures of keeping the production data safe. One such measure includes performing a snapshot, e.g., a point-in-time snapshot copy of an entire logical volume or an entire data set of the device, of the production data, and using the snapshot of the data for DR testing. Utilizing a snapshot serves as a relatively efficient technique for performing DR testing in some data storage systems, however, for several reasons, this is not the case in cloud based storage systems. For example, enabling snapshots of a set of data on a cloud storage system may be time consuming and costly. There are several types of cloud storage systems that offer a variety of pay options. Some of these systems provide inexpensive storage for imports but charge for exporting the data. Other systems schedule payments based on storage space and some according to transactions. Yet, others may offer temporary storage options at a relatively lower cost. Enabling snapshots to be performed in a cloud storage device as a DR test strategy also adds to the complexity of cleaning up the test data once DR testing is complete. This is because users are forced to access the cloud storage device directly to clean up the test data manually, which introduces security risks and the potential for mistakes.

There are several other scenarios in which there is a need to preserve all data in a cloud storage vault. For example, a judicial court may order that a legal hold be placed on data in a cloud storage vault, e.g., in order to preserve the data for discovery purposes. Preventing delete and/or modification type transactions on a system in view of such a legal hold is an extremely difficult process, and trying to preserve data while continuing normal business operation is an even more monumental process.

Accordingly, conventional cloud based data storage lacks solutions to preserve data without causing business interruptions, as well as a safe yet relatively affordable mechanism for performing DR testing. In sharp contrast to the deficiencies of the conventional approaches described directly above, various approaches described herein enable data of a data storage system to be preserved without causing business interruptions, as well as enable a mechanism to safely and affordably perform DR testing in cloud storage devices.

Figure 3:
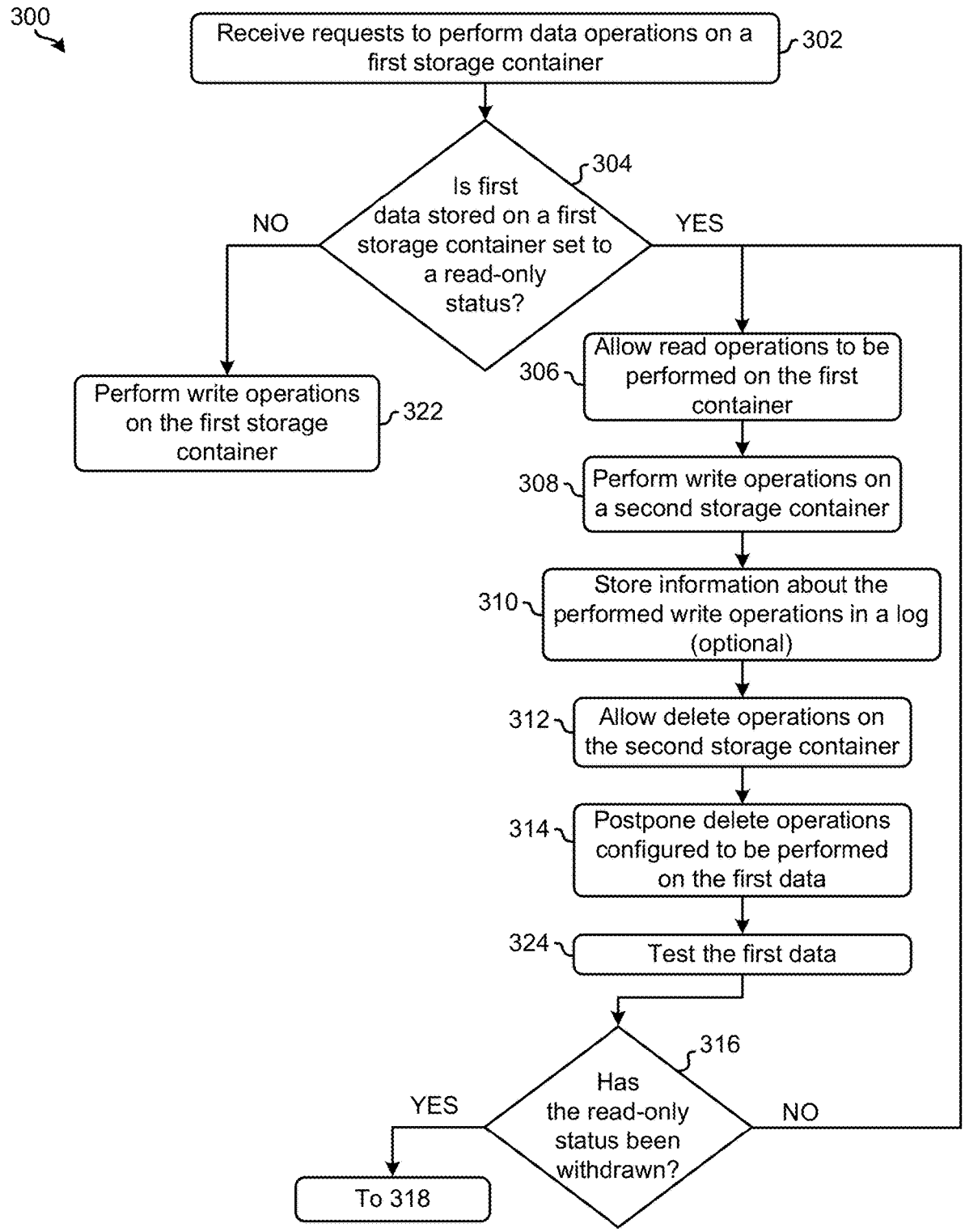
FIG. 3 is a flowchart of a method, in accordance with one approach.
Figure 3:
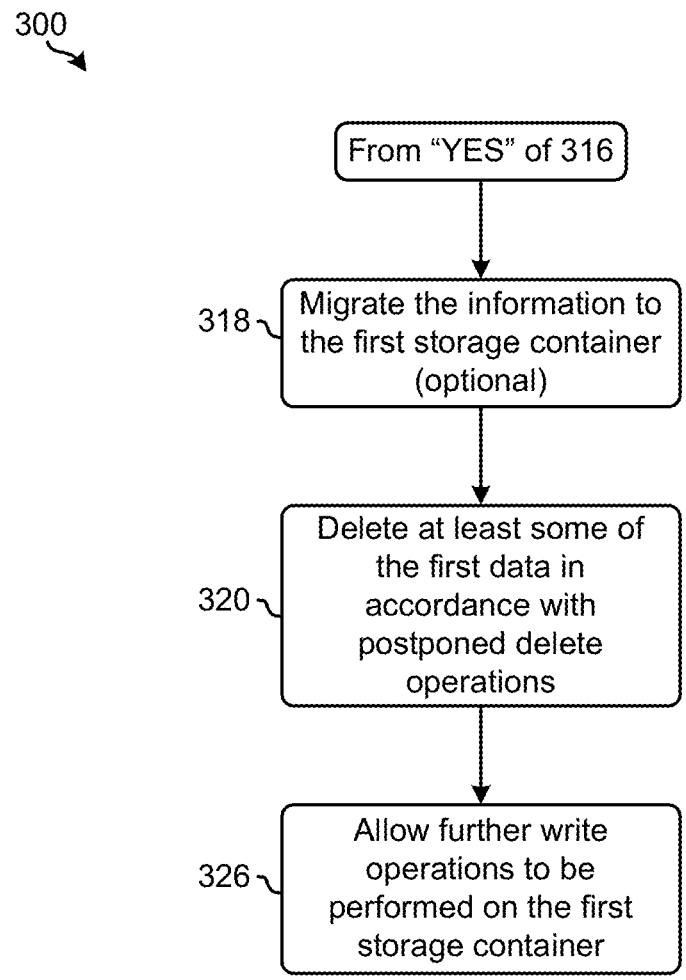

Now referring to FIG. 3, a flowchart of a method 300 is shown according to one approach. The method 300 may be performed in accordance with the present invention in any of the environments depicted in FIGS. 1-2 and 4-6B, among others, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

For context, it may be prefaced that method 300 includes a two-part process for enabling testing of data and/or placing a hold on a state of the data of a storage container, without causing business interruptions to a data storage system that includes the storage container, e.g., applications and policies of the storage system remain intact during the testing. The first part of the process allows an application, such as a virtual tape library, the ability to set a catalog of data for a storage container, such as a cloud storage vault, to a read-only status. The second part of the process involves setting up a different storage container, e.g., a second storage container which serves as a redirect storage container, to be used to write new data or to make a modification to existing data while the read-only status is active. In some approaches the second storage container may additionally and/or alternatively at least temporarily include a copy of the data of the first storage container, to be used for testing while the data of the first storage container is set to a read-only status. Thereafter, in order to performing testing on the data on the first storage container, properties of the first storage container may be set to the second storage container, and all workload targeting the first storage container is protected as any modification operations that are to be performed on the first storage container may be either postponed or redirected to the second storage container.

Operation 302 of method 300 includes receiving requests to perform data operations on a first storage container. In some preferred approaches, at least some of the data operations are configured to be performed in order to test data on the first storage container. Moreover, at least some of the data operations may be actual workload data operations. According to one illustrative example, the data operations include at least a read operation and a write operation.

The first storage container may be any known type of storage container, although in some approaches described herein, the first storage container may be a production cloud vault on a cloud based storage system. Moreover, the first storage container may be included in any type of data storage system. For example, in one approach, the first storage container may be on a cloud storage device. Accordingly, in some approaches, software may be provided as a service in a cloud environment. In another approach, the first storage container may be a plurality of predetermined storage addresses in a local storage device.

The received requests may include any one or more different types of data operations that are to be performed on the first storage container. For example, according to various approaches, the data operations of the received requests may include one or more, e.g., read operations, write operations, delete operations, copy operations, append operations, head operations, list operations, operations for changing the attributes that manage the first data such as a policies, operations that change the metadata associated with an object, etc. Depending on the approach, one or more of such operations may be of a known type. In some approaches the requests may be received from more than one location, while in some other approaches, the requests may be received from a single location. A non-limiting list of such locations may include, e.g., a user device, a controller, a second storage container, a computer, a server, etc.

In some approaches, it is determined whether first data stored on a first storage container and/or whether the first storage container itself is set to a read-only status, e.g., see decision 304. For context, in some approaches, the first data may be data that associated with the received requests. For example, according to one approach, the first data may be data that is targeted by at least some of the data operations. Based on the first data being set to a read-only status, in some approaches, operations other than read operations, e.g., write operations, delete operations, partial-overwrite operations, append operations, list operations, head operations, etc., may be prevented from being performed on the first data. As a result of non-read data operations being prevented from being performed on the first data stored on a first storage container, the state of first data stored on a first storage container is preserved for at least a period of time that the read-only status is set.

In some approaches, method 300 includes setting the read-only status. Reasons for setting a read-only status may depend on the approach. For context, the read-only status may be set on data, such as the first data, to prevent a current state of the data from being changed during testing of the data. Accordingly, the read-only status may be set on the first data in order to allow testing to be performed on the first data. Note that in some approaches the testing is performed on another storage container, e.g., such as second storage container that includes a modified copy of the first data. However, in some other approaches, one or more known types of testing operations may be performed on the first storage container, provided that the state of the first data is not changed while the read-only status is set.

The read-only status may be set in response to receiving a command to set the read-only status. For example, according to some approaches, the read-only status may be set in response to receiving a command for at least temporarily preserving a current state of the first data. According to several more specific approaches, the command for at least temporarily preserving a current state of the first data may be received as, e.g., a legal hold command to allow litigation discovery to be performed on data stored on the first storage container, a command for complying with a troubleshooting process to be performed on the first storage container, a command to allow a Human Resources (HR) investigation to be performed on data of the first storage container, a command to comply with a known type of audit that is scheduled to be performed on a company storage system that includes the first storage container, etc. The read-only status may thereafter be withdrawn in response to receiving a command to withdraw the read-only status. Such a command may include a command to lift the preservation of the current state of the first data.

The read-only status may be indicated in one or more ways depending on the approach. For example, in one approach, the read-only status may be indicated on a catalog, e.g., a table, a database, a list, etc., of the first data. In such an approach, credentials of one or more applications associated with data operations that are not read-only data operations may be revoked, while credentials of one or more applications associated with read-based data operations may be not revoked. The first storage container may in such an approach be configured to only allow access to the first data of the first storage container in response to a determination that an application currently possesses valid credentials. In another approach, the read-only status may be indicated by one or more pointers that point to at least some of the first data and/or the first storage container. According to yet another approach, the read-only status may be indicated by read operations being absent from a dynamic list of operations that are at least temporarily not allowed to be performed on the first data and/or the first storage container. In another approach, the read-only status may be indicated using known techniques for setting a read-only status on data and/or a storage container.

Note that depending on the approach, the read-only status may be indicated at one or more different granularities, e.g., a pool, a container, an object, etc. In contrast, in some other approaches, the read-only status may be automatically triggered based on detection and/or determination of a predetermined condition being met. Such detections and/or determinations may be performed using known techniques. For example, in some approaches, the predetermined condition may be a situation, e.g., such as a malicious behavior, data corruption, etc. Where such a condition is met, data, e.g., in the pool, container, etc., may be marked as read-only and all new writes may be redirected to a predefined storage container. Moreover, a host may be notified of the situation. Thereafter, in some approaches the read-only status may be removed by a host user once the condition has been investigated and resolved.

In response to a determination that the first data is not set to the read-only status, e.g., as illustrated by the "NO" logical path of decision 304, in some approaches, one or more of the data operations indicated in the received requests may be performed on the first data on the first storage container. It should be noted that in one or more of such approaches, the data operations performed may include at least some non-read based data operations. For example, according to a more specific approach, in response to a determination that the first data is not set to the read-only status, write operations, e.g., new data writes, modifying data write operations such as append data write operations, backup data write operations such as a mirroring data write, a known type of error recovery data write operation, etc., may be performed on the first storage container, e.g., see operation 322 of method 300. Read operations, pending data operations, backup operations, etc., may additionally and/or alternatively be performed on the data of the first storage container in response to the determination that the first data is not set to the read-only status.

In contrast, in response to a determination that the first data is set to the read-only status, e.g., as illustrated by the "YES" logical path of decision 304, in some approaches, read operations of the data operations may be allowed to be performed on the first storage container for reading the first data thereon, e.g., see operation 306 of method 300. Note that in one approach, a read operation may include a "GET" command to read a most recent version of the first data. This data may in some approaches be located in the first storage container. In another approach, the data may be located in a second storage container. The second storage container may in one approach be a predetermined redirect container that non-read based operations, e.g., data writes of the first storage container, are redirected to at least for the period that the read-only status is set on the first storage container. In such an approach, the first storage container may be a production vault and the second storage container may be a DR Test vault that is configured to be a redirect data repository, e.g., redirect pool. Accordingly, in some approaches where the data operations include at least a read operation and a write operation, the read operation may be performed on the first storage container, and the write operation may be performed on the second storage container. In order to fulfill a read data operation, method 300 may include identifying a location of the most recent version of the data and reading the data at the determined location.

In some approaches, based on the determination that the first data is set to the read-only status, one or more operations of the data operations may not be allowed to be performed on the first data on the first storage container. Instead, one or more operations of the data operations that would otherwise change a state of the first data on the first storage container may be performed on a different storage container, e.g., redirected to the second storage container. For example, write operations of the data operations may be performed on a second storage container that is different than the first storage container, e.g., see operation 308 of method 300. According to some specific approaches, the second storage container may include a copy of the data of the first storage container, e.g., a modified copy to use for testing and/or continued workload operations during the testing. The copy of the data of the first storage container may be generated in an optional operation of method 300. Method 300 may optionally additionally and/or alternatively include storing the copy of the data of the first storage container on the second storage container, e.g., such as in response to receiving a request from a user device to test the first data, in response to the first data being set to the read-only status, in response to a determination that performance of the data storage system has fallen below a predetermined threshold, in response to a determination that a predetermined number of data operations have been performed on the first storage container, in response to a determination that a predetermined amount of data has been written to the first storage container, etc.

Write operations, e.g., such as a "PUT" command for writing new data, of the data operations may in some approaches be distributed and performed on a plurality of different storage containers. For example, the data operations may be distributed to a plurality of different storage containers that are each configured to test the data of the first storage container by performing a different one of the non-read data operations on a copy of the first data stored thereon. In some approaches, one or more of the write operations may be distributed to storage containers that are located on different data storage systems and/or different data storage devices.

It should be noted that although some approaches include only a single production container, e.g., the first storage container, and a single test container, e.g., the second storage container, some alternative approaches may include more than one production container, and each of such production containers may be configured to redirect non-read data operations to a separate test container during testing.

The received request may additionally and/or alternatively include a data operation that is a command to delete the first data. In one approach, a copy of the first data may be stored on the second storage container. For example, the copy of the first data may be a modified copy of the first data that is modified by one or more data operations that are redirected to the second storage container while the first data of the first storage container is set to the read-only status. In this example, while the first data is set to the read-only status, new data intended for the first data on the first storage container may only be written to and stored on the second storage container. The first storage container may have an original and/or older versions of that volume or potentially the a version of the volume may be marked as scratch or may have even been picked up and reused by a production system, which continues to run production I/O in the background while the first data is set to the read-only status. In response to the received request including a data operation that is a command to delete the first data, in some approaches, the modified copy of the first data stored on the second storage container may be deleted and/or be allowed to be deleted. Note that the copy of the first data stored on the second storage container may be deleted and/or be allowed to be deleted while the first data is set to the read-only status because performing the delete operation on the copy of the first data while the first data is set to the read-only status does not change a state of the first data. The delete operation may optionally additionally and/or alternatively be performed on the first data on the first storage container in response to determining that the read-only status has been withdrawn.

In some approaches, the data operations may include a "MOD" command, e.g., a command to append data. Data appends may be performed but the appended data may not be written to the first storage container when the read-only status is set on the first storage container. Instead, in one approach, method 300 may include redirecting the data operation to the second storage container and performing the append operation on the second storage container. Note that each of the data operations may be cataloged so there is always a clear understanding of where the data is stored. Moreover, data in the first storage container is not modified on a DR test machine.

In contrast, the received request may additionally and/or alternatively include a data operation that is a command to delete at least some of the first data stored on the first storage container. During the first data being set to a read-only status, data operations other than read operations may in some approaches be postponed from being performed on the first data and/or on the first storage container. For example, in response to a determination that the first data is set to the read-only status, in one approach, deletion of the some of the first data may be postponed, e.g., see operation 314 of method 300. In one approach, postponing the delete data operation may include marking the data that is to be deleted as it would be marked for a scheduled deletion, but the delete may not be performed until the read-only status is withdrawn from the first data. This prevents the delete command from failing. Moreover, delete operations of the first data may be postponed in order to prevent the state of the first data from changing during the read-only status being set on the first data.

It should be noted that in some approaches in which the read-only status of the first data is set for DR testing purposes, the read-only setting may only be valid on a DR test system. Moreover, a production system may continue to operate in the background without being subjected to the read-only status of the first data. Accordingly, the production system can perform modifying data operations, e.g., write operations, delete operations, etc., on the first storage container. Moreover, a delete data operation that is directed through the DR testing system may never be performed by the DR testing system. Such approaches, however, may be differentiated from other approaches in which the read-only status may be set on the production system directly, e.g., a legal hold scenario. In such an approach, delete data operations may be postponed until the legal hold, as applied by the read-only status, is removed.

During the first data being set to the read-only status, the first data may be tested, e.g., see operation 324 of method 300. The testing may include any known type of testing, e.g., DR testing, error encoding testing, data verification testing, etc. In one preferred approach, the read-only status may be on the first data for at least a period that disaster recovery testing is being performed on the first data, although, as mentioned elsewhere above, the testing of the first data may in some approaches be performed on a modified copy of the data on another storage container such as the second storage container. Accordingly, in response to completing the testing on the first data, method 300 may optionally include withdrawing the read-only status on the first data. Note that in some approaches, one or more of the data operations may continue to be redirected to the second storage container subsequent to the read-only status being withdrawn. In some approaches, the data operations redirected to the second storage container subsequent to the read-only status being withdrawn may include non-read based data operations of a second requests to perform data operations, e.g., where the second request is received subsequent to the read-only status being withdrawn. For example, write operations may be performed on the second storage container subsequent to the read-only status being withdrawn. In some approaches, the data operations redirected to the second storage container subsequent to the read-only status being withdrawn may include a predetermined portion of data operations originally directed to be performed on the first storage container. This predetermined portion of data operations being redirected to the second storage container may balance a workload between the first storage container and the second storage container, as to not create a delay in the first storage container otherwise being assigned a relatively large portion of the workload.

In some approaches, the data operations performed on the second storage container while the first data is set to a read-only status may only be intended to be temporarily reflected on the second storage container. For example, as will be described in greater detail elsewhere herein, method 300 may include migrating and/or additionally performing some of the data operations redirected to the second storage container on the first data on the first storage container once the read-only status has been withdrawn, e.g., see operations 316-320. Accordingly, in some approaches, method 300 may include storing information about the data operations performed on the second storage container. For example, information may be stored about the write operations performed on the second storage container while the first data is set to the read-only status, e.g., see operation 310. However, as noted in operation 310 FIG. 3, such storing of information may be optional in some approaches.

The information about the performed write operations may in some approaches be stored in a log. Such a log may be stored in a second catalog that is different than a catalog that indicates the read-only status. One or more of such catalogs may in some approaches be stored on one or more storage containers. However, in some other approaches, the catalogs may be stored at one or more known locations for storing data location information such as, e.g., a data index, a collection of pointers, a table, etc. In another approach, the log may additionally and/or alternatively be stored on a catalog indicating the read-only status. The information may in some approaches include, e.g., metadata detailing the location of data, metadata detailing a plurality of write locations of a split data write operation, pointers, information stored on an index, the versioning of the data that is stored at any given location, etc.

Decision 316 include determining whether the read-only status has been withdrawn. Such a determination may be based on various considerations, e.g., based on whether a predetermined flag that indicates a current status of the first data is set, based on whether a predetermined pointer that indicates a current status of the first data is set to point at a predetermined status of the first catalog, based on whether a command has been received to withdraw the read-only status, etc. The determination of whether the read-only status has been withdrawn may be performed any number of times, and may be performed in response to one or more determinations. In some approaches, the determination of whether the read-only status has been withdrawn may be performed periodically. According to another approach, the determination of whether the read-only status has been withdrawn may additionally and/or alternatively be performed in response to at least a predetermined threshold amount of processing resources being consumed processing the data operations. In yet another approach, the determination of whether the read-only status has been withdrawn may additionally and/or alternatively be performed subsequent to performing one or more of the data operations, e.g., such as subsequent to performing a predetermined number of the data operations of the received requests. The determination of whether the read-only status has been withdrawn may additionally and/or alternatively be performed in response to at least a predetermined threshold amount of resources being consumed performing first data write operations on the second storage container.

In response to a determination that the read-only status has not been withdrawn, e.g., as illustrated by the "No" logical path of decision 316, in some approaches, one or more of the data operations of the received requests may continue to be performed (if any remain), e.g., performed on the second storage container. In the event that additional requests to perform data operations are received, in some approaches, the data operations of the additional requests may be performed in accordance with the operations 306-314, until a determination is made that the read-only status has been withdrawn.

In response to a determination that the read-only status has been withdrawn, e.g., as illustrated by the "YES" logical path of decision 316, in some approaches, the information may be migrated to the first storage container, e.g., see operation 318 of method 300. In some approaches the read only status of the first data may be indicated on a catalog of the first data. Moreover, the log to which information about the performed write operations stored may be a second catalog. In such an approach, an optional migration of the information may include migrating information of the second catalog to the catalog of data stored on the first storage container in response to determining that the read-only status has been withdrawn. In another approach, where the information is information about the performed write operations, method 300 may include using the information, e.g., information stored in a log, to associate data written during a write operation performed on the second storage container, with the first data. For example, assuming that a write operation that was intended to be performed on the first data is redirected and performed on the second storage container while the first data is set to the read-only status, using the information may include redirecting a pointer from the instance of data on the second storage container to the first data. Migrations may be performed using known techniques for migrating information in some approaches.

In addition to and/or alternative to the information of the second catalog being migrated to the catalog of data stored on the first storage container, in some approaches, upon concluding DR testing of the first data, a DR test system may be shut down and later be brought back up to access the test vault and/or both a catalog of the DR test system, and any test data may be wiped clean and re-cataloged to prepare for a subsequent test.

In response to determining that the read-only status has been withdrawn, method 300 may additionally and/or alternatively include allow further write operations to be performed on the first storage container, e.g., see operation 326 of method 300. In some approaches, the further write operations may be a data operation that was received while the first data was set to the read-only status. In another approach, the further write operations may be a data operation that was received after the read-only status is withdrawn.

In some approaches, one or more data operations may be performed on the first data and/or on the first storage container in response to the read-only status being withdrawn. For example, one or more delete operations configured to be performed on the first data that were postponed while the first data was set to the read-only status, e.g., see operation 314, may be performed in accordance with the postponed delete operations, e.g., see operation 320 of method 300. Accordingly, in one approach, some of the first data may be deleted in response to the determination that the read-only status has been withdrawn. Data on the second storage container may additionally and/or alternatively optionally be effectively migrated to the first storage container in response to the determination that the read-only status has been withdrawn. For example, in response to a determination that the read-only status has been withdrawn, a read operation performed on the second storage container while the first data was set to the read only status may be performed on the first data. In some other approaches, such a migration may include operations including, e.g., overwriting data on the first storage container, writing new data to an unclaimed write location on the first storage container, redirecting a logical pointer from the second storage container to the first storage container, etc. In some approaches, subsequent to optionally migrating data from the second storage container to the first storage container, at least some of the data may be deleted on the second storage container. In some other approaches, subsequent to migrating data from the second storage container to the first storage container, the data may be at least temporarily kept on the second storage container. One or more of such approaches may be rare, however they describe approaches in which a DR testing process creates data, such as data for passing testing audits. This is because the end user may need a way to store that data in the real production pool since they must access it from a production environment. In contrast, for one or more approaches that involve DR testing, the modified test data may simply just be deleted. In yet further contrast, for one or more approaches that involve a legal hold case, both containers may be kept, and the second container may be gradually emptied, at which the empty container may be removed, e.g., by a user, once empty. Assuming that the legal hold scenario has been performed for a relatively extended period of time thereby resulting in a majority of the data being accumulated on the second storage container, in some approaches, all data may be permanently redirected to the second storage container and the first storage container may be allowed to clear all delete-pending data and thereby slowly empty the first storage container until the first storage container is no longer needed.

It should be noted that allowing only read data operations to be performed on the first data while the first data is set to the read-only status and redirecting and/or postponing other data operations, enables testing to be performed on the first data without interruptions being experienced in the data storage system that includes the first storage container. This is because non-read operations are postponed from being incorporated on the first data until the read-only status is withdrawn. In the meantime, testing may be performed on the first data and/or a copy of the first data without causing a loss of functionality in the storage system, e.g., as a result of non-read data operations being redirected to a redirect storage container such as the second storage container. Accordingly, while the read-only status is enabled, data operations such as data write operations are still able to be fulfilled, and therefore applications and policies of the storage system remains intact during the testing. This also embeds an added degree of safekeeping within the data storage process, because non-read data operations are redirected to a testing storage container during testing, and as a result, "user data" on the production container is not subject to being compromised and/or lost as a result of otherwise performing non-read data operations on the first storage container during testing. It should be noted that while a system is in a DR testing mode and the system is given only read-only access to the first storage container, e.g., the production container, the production systems may be constantly performing modifying data operations, e.g., read operations, write operations, delete operations, etc., on the first storage container. Accordingly, production is preferably continued without interruption. This also enables a temporary hold to be placed on the first data on the first storage container, because non-read operations are redirected to the second storage container and/or postponed until the read-only status is withdrawn. This enablement of DR testing and/or placing a hold on the first data on the first storage container without causing business interruptions, e.g., such as an inability to fulfill a write operation, is not available in conventional data storage systems today. This is because in conventional data storage systems, data is typically able to be written to and read from a cloud storage device as long as the application speaks the right protocol and has the right credentials. Such applications track what is stored on the cloud storage devices so the data can later be accessed. The credentials enable permissions to read, write and/or delete data on the device. Once an application is provided the permissions however, withdrawing such permission is a resource intensive task, e.g., modifying applications and/or permissions. Accordingly, conventional storage systems are able to either perform DR testing on data or modify the data, but not both. It should be noted that although a separate set of credentials configured to only allow read access to the data could be set up, however, this would prevent any writing of test data. This is problematic because in such a scenario the readability of the data is able to be proven, however, the ability to additionally write or append to the data is not possible. Accordingly, the inventive discoveries disclosed herein with regards to allowing only read operations to be performed on the first data while the first data is set to the read-only status and redirecting and/or postponing other data operations proceed contrary to conventional wisdom.

Figure 5A:
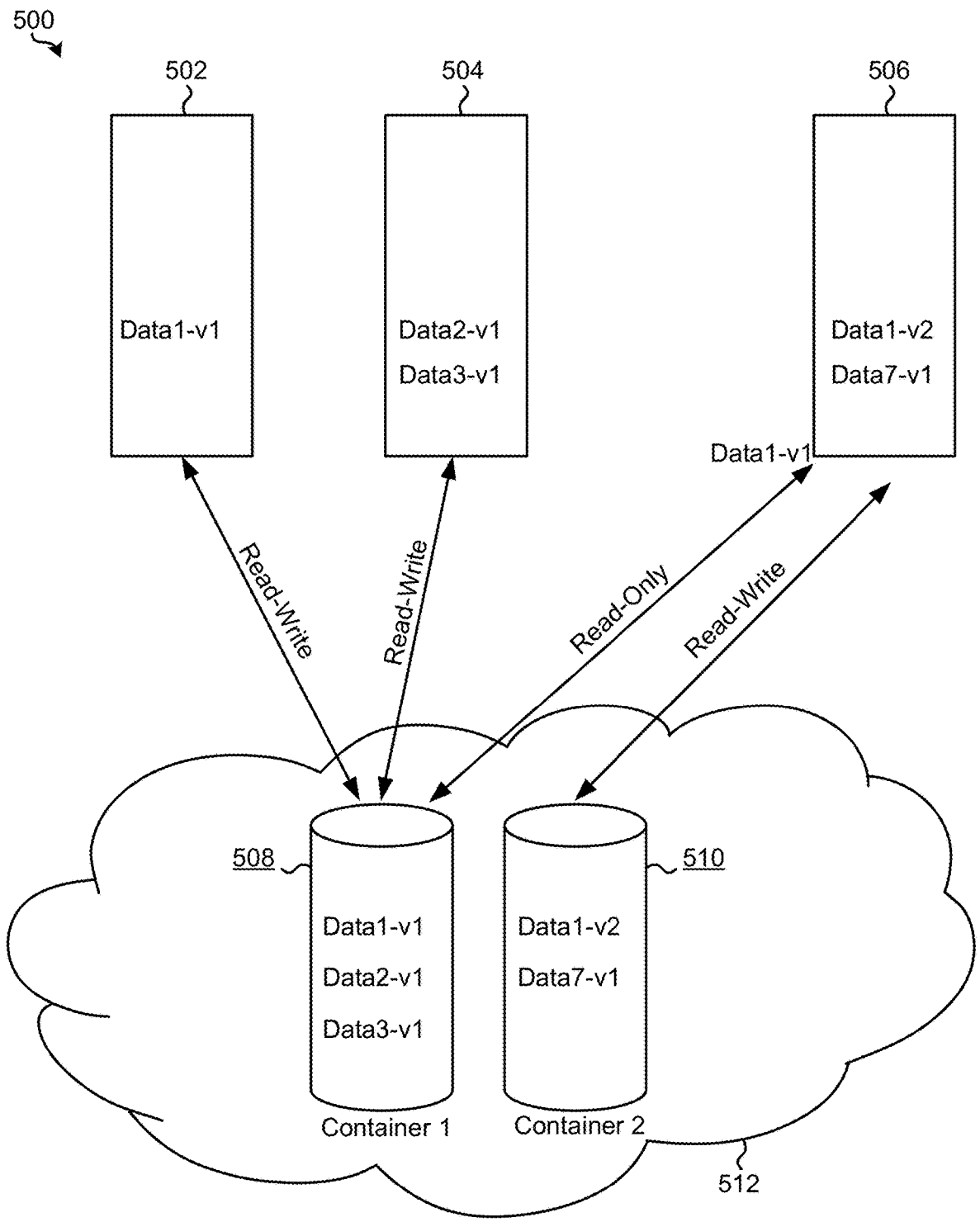
FIG. 5A is a data storage architecture, in accordance with one approach.

An illustrative example of a data storage environment in which only read operations are allowed to be performed on data of a storage container while the data is set to the read-only status and in which other data operations are redirected to another storage container during the read-only status being set is shown in FIG. 5A.

Figure 4:
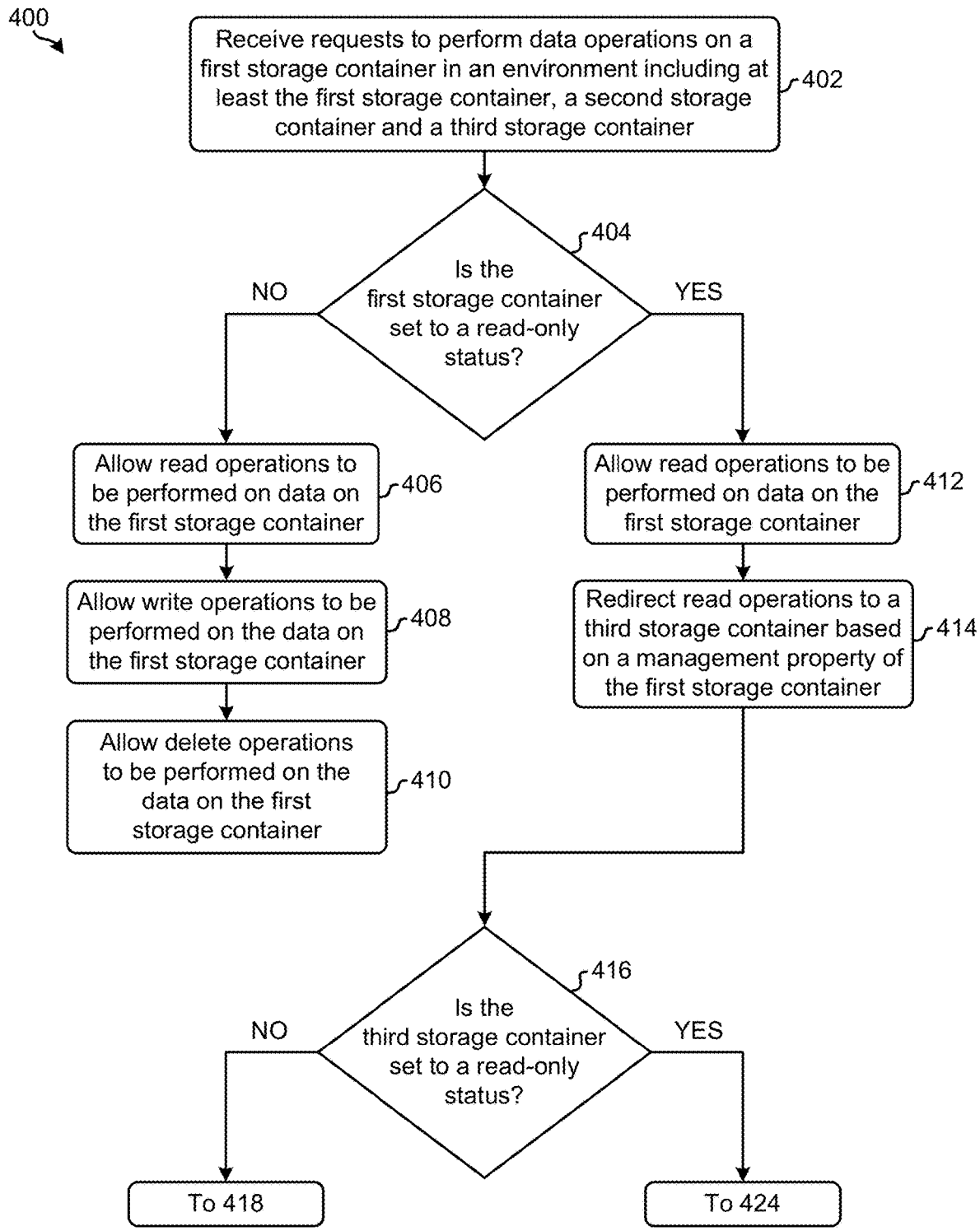
FIG. 4 is a flowchart of a method, in accordance with one approach.
Figure 4:
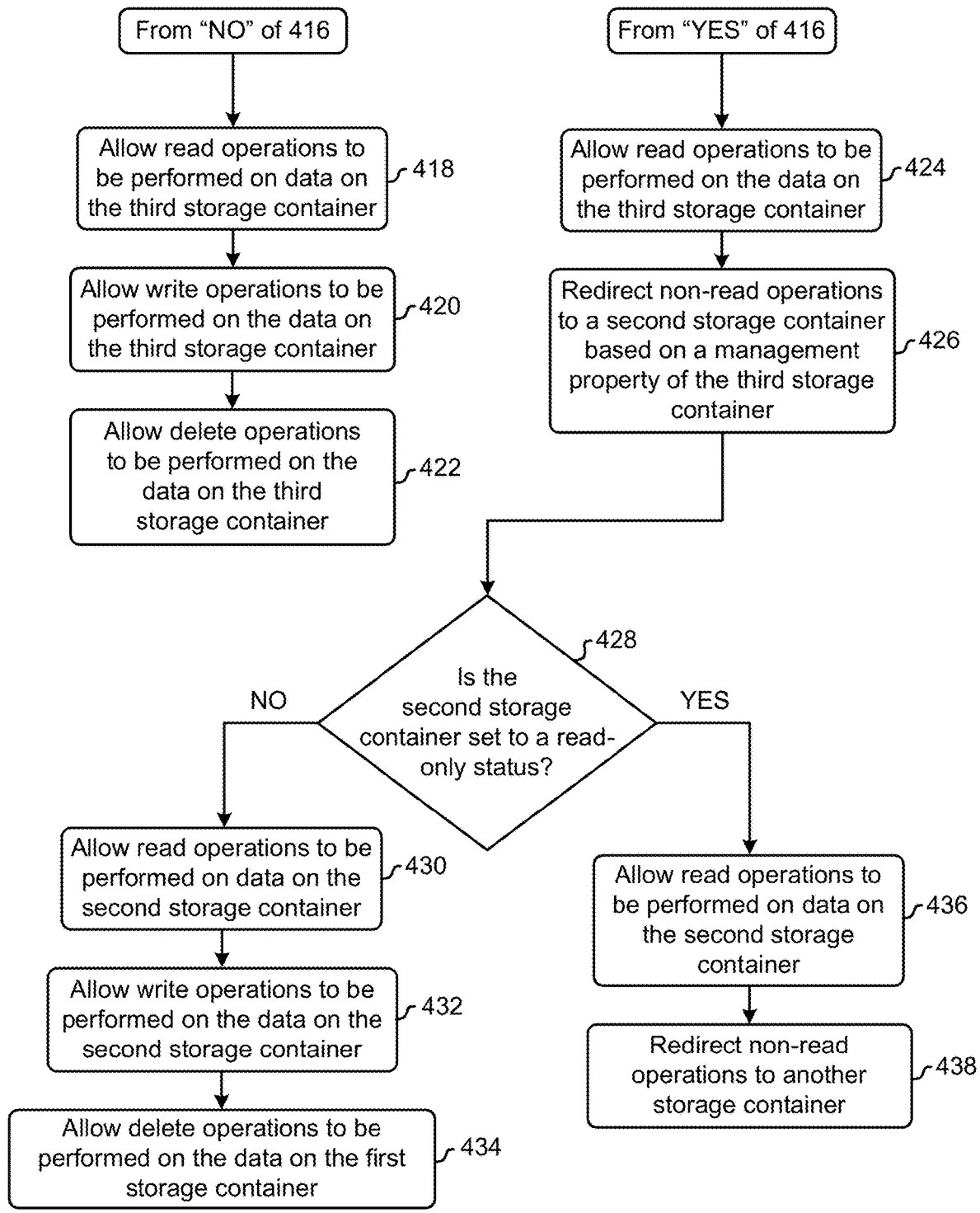

Now referring to FIG. 4, a flowchart of a method 400 is shown according to one approach. The method 400 may be performed in accordance with the present invention in any of the environments depicted in FIGS. 1-3 and 5A-6B among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

For context, it may be prefaced that method 400 includes a process for establishing optional cascading redirect pools. Note that the "pools" may in some approaches be a collection of data that is stored in a particular container depending on predefined policies. Accordingly, the term "cloud pool" may be referred to as a "storage container" in method 400. As will be described in further detail elsewhere herein, a first storage container may have a redirect pool, e.g., which may be a second storage container, which may have a different redirect pool, e.g., a third storage container, etc. Accordingly, any data write operations directed at being performed on the first storage container are redirected to the second storage container, and any data write operations directed at being performed on the second storage container and/or any write operations redirected to the second storage container are redirected to and performed on the third storage container. This concept of cascading redirection may be used as a rotating Point In Time (PIT) air gap copy in data recording. As data writes are rotated through the storage containers, e.g., cascading, there may be up to an Nth number of data collections, e.g., at least one collection per storage container. This concept may be conveniently applied in an environment where the workload is repetitive, e.g. backup once a day, as a new container for redirecting data operations may be established each day. Accordingly, data of a given storage container is protected from being modified or deleted until the storage container is designated as the container having the read-write status, e.g., based on a rotating designation.

Operation 402 includes receiving requests to perform data operations on a first storage container. For context, the first storage container may be any known type of storage container. Moreover, the first storage container may be included in any type of data storage system. For example, in one approach, the first storage container may be on a cloud storage device. More specifically, in one approach, the first storage container may be a cloud storage vault in on a cloud based storage system and/or a cloud environment. Accordingly, in some approaches, software may be provided as a service in a cloud environment. In another approach, the first storage container include a plurality of predetermined storage addresses in a local storage device. In some approaches, it may be assumed that the first storage container is in an environment that includes a plurality of storage containers, e.g., the first storage container, a second storage container, a third storage container, etc.

The received requests include any one or more different types of data operations that are to be performed on the first storage container. For example, according to various approaches, the data operations of the received requests may include one or more, e.g., read operations, write operations, delete operations, copy operations, append operations, etc. Depending on the approach, one or more of such operations may be of a known type. In some approaches the requests may be received from more than one location, while in some other approaches, the requests may be received from a single location. A non-limiting list of such locations may include, e.g., a user device, a controller, a queue, a storage container, a computer, a server, etc.

It may be determined whether the first storage container is set to a read-only status, e.g., see decision 404 of method 400. In response to a determination that the first storage container is not set to the read-only status, e.g., as illustrated by the "NO" logical path of decision 404, one or more of the data operations may be performed on the first storage container. In some approaches such a determination may be based on a catalog of the first storage container, which may be checked to determine whether the first storage container is not set to the read-only status. In another approach, the determination may be based on whether or not the first storage container is set to a read-write status. In such an approach, a storage container may be determined to not be set to a read-only status in response to a determination that the first storage container is set to a read-write status.

A first of the data operations that may be performed on the first storage container in response to a determination that the first storage container is not set to the read-only status includes a read operation. For example, read operations of the data operations may be allowed to be performed on data on the first storage container, e.g., see operation 406. A second of the data operations that may be performed on the first storage container in response to a determination that the first storage container is not set to the read-only status includes a write operation. For example, write operations of the data operations may be allowed to be performed on the data on the first storage container, e.g., see operation 408 of method 400. Another operation that may be performed on the first storage container in response to a determination that the first storage container is not set to the read-only status includes allowing delete operations of the data operations to be performed on the data on the first storage container, e.g., see operation 410 of method 400. Further operations that may be performed on the first storage container in response to a determination that the first storage container is not set to the read-only status includes allowing append data operations on the first storage container.

In response to a determination that the first storage container is set to the read-only status, e.g., as illustrated by the "YES" logical path of decision 404, read operations of the data operations may be allowed to be performed on the data on the first storage container, e.g., see operation 412 of method 400. Read operations may be performed on the data on the first storage container during the read-only status being set on the first storage container because performing read operations does not change a state of the data on the first storage container. However, in some approaches, data operations that are not read operations may not be performed on the first storage container in response to a determination that the read-only status is set on the first storage container. For example, non-read based data operations of the data operations, e.g., such as write operations may be redirected to another storage container, e.g., such as the third storage container, e.g., see operation 414 of method 400. The redirection of at least some of the data operations from the first storage container to the third storage container may be at least in part based on a management property of the first storage container. For example, the management property of the first storage container may specify that non-read data operations, e.g., such as write operations of the first storage container, be redirected to the third storage container while the first data set is set to the read-only status.

As illustrated in decision 416, method 400 may include determining whether the third storage container is set to the read-only status prior to performing any non-read data operations on the third storage container, e.g., such as the data operations redirected from the first storage container to the third storage container. For context, as will be described elsewhere below, such a determination may be performed because in some approaches, more than one storage container of an environment may be set to the read-only status at the same time to thereby create a cascading redirect of data operations to a single storage container that is set to a read-write status, e.g., such as the second storage container.

In response to a determination that the third storage container is not set to the read-only status, e.g., as illustrated by the "NO" logical path of decision 416, one or more of the data operations may be performed on the third storage container. In one approach, such a determination may be based on a determination that the third storage container is set to a read-write status. A non-exhaustive list of operations that may be performed in response to determining that the third storage container is not set to the read-only status include allowing read operations to be performed on data on the third storage container, e.g., see operation 418 of method 400, allowing write operations to be performed on the data on the third storage container, e.g., see operation 420 of method 400, allowing delete operations to be performed on the data on the third storage container, e.g., see operation 422 of method 400, allowing append operations to be performed on the third storage container, etc.

In response to a determination that the third storage container is set to the read-only status, e.g., as illustrated by the "YES" logical path of decision 416, read operations may be allowed to be performed on the data on the third storage container, e.g., see operation 424. However, non-read operations are preferably not allowed to be performed on the third storage container while the read-only status is set on the third storage container. Instead, non-read data operations that are to be performed on the third storage container, including the non-read data operations redirected to the third storage container from the first storage container, may be redirected from the third storage container to another storage container. For example, the data operations may be redirected from the third storage container to the second storage container, e.g., see operation 426 of method 400.

In some approaches, the redirection of data operations from the third storage container to the second storage container may be based on a management property of the third storage container. For example, in one approach, a management property of the third storage container may specify that write operations of the third storage container be redirected to the second storage container while the third storage container is set to the read-only status. Note that these redirected data operations may include data operations redirected to the third storage container, e.g., such as from the first storage container. Accordingly, a redirection of the write operations of the first storage container to be performed on the second storage container while the first storage container is set to the read-only status may be based on a management property of the first storage container and a management property of the third storage container.

It may be determined whether the second storage container is set to a read-only status, e.g., see decision 428 of method 400. In one approach, such a determination may be performed in response to one or more data operations being redirected to the second storage container from the third storage container. In response to a determination that the second storage container is set to a read-only status, e.g., as illustrated by the "YES" logical path of decision 428, read operations may be allowed to be performed on data on the second storage container, e.g., see operation 436 of method 400. Moreover, in one approach, in response to a determination that the second storage container is set to a read-only status, non-read operations may be redirected to another storage container, e.g., see operation 438 of method 400. In one approach, the another storage container may be a storage container that is set to a read-write status, where the operations may be performed. However, in some other approaches, the another storage container may be a storage container that is set to a read-only status. In such approaches the data storage system may include at least five storage containers because in order to allow data operations to be performed during a plurality of storage containers being set to the read-only status, at least one of the storage containers preferably is set to a read-write status. However, in another approach, if there are no other storage containers that are not set to the read-only status, method 400 may optionally include outputting a notice, e.g., to an administrator of the data storage system, that requests that one of the storage containers be set to the read-write status.

In response to a determination that the second storage container is not set to a read-only status, e.g., as illustrated by the "NO" logical path of decision 428, read operations may be allowed to be performed on data on the second storage container, e.g., see operation 430 of method 400. In one approach, such a determination may be based on a determination that the second storage container is instead set to a read-write status. Accordingly, the second storage container may be configured to accept non-read operations intended for the first storage container and accept non-read data operations intended for the third storage container based on the second storage container being set to a read-write status while the first storage container and the third storage container are set to the read-only status. Write operations of the data operations and/or delete operations of the data operations may additionally and/or alternatively be allowed to be performed on the data on the second storage container in response to the determination that the second storage container is not set to a read-only status, e.g., see operations 432-434 of method 400. More specifically, write operations intended for the first storage container and write operations intended for the third storage container may be performed on the second storage container based on the second storage container being set to a read-write status while the first storage container and the third storage container are set to the read-only status. Note that in some approaches, delete operations intended to be performed on data of a particular one of the storage containers may be postponed until the particular storage container is set to the read-write status.

A time period that a read-write status is set for on a storage container may depend on the approach. Similarly, a time period that the read-only status is set for on a storage container may depend on the approach. For example, in some approaches, a storage container may be set to the read-only status for a predetermined time period. In one preferred approach, the read-only statuses of a plurality of storage containers may be set for the same predetermined time period. Moreover, in such an approach, the predetermined time period that the plurality of storage containers are set to the read-only status may be the same as a predetermined period of time that a storage container in the data storage system is set to the read-write status. The read-only status of one or more of the storage containers may in some approaches be withdrawn in response to a determination that the predetermined time period has elapsed. Such a determination may be performed using known techniques, e.g., such as monitoring and determining that a predetermined countdown timer has expired, etc. In some approaches, at least a first storage container may be set to the read-write status in response to a read-only status being withdrawn from the first storage container. For example, it may be assumed that the first storage container and the third storage container are set to the read-only status for the predetermined time period while the second storage container is set to the read-write status for the predetermined time period. In response to a determination that the predetermined time period has elapsed, the read-only status of the first storage container and the read-only status of the third storage container may be withdrawn. The read-write status of the second storage container may also be withdrawn. In response to a determination that the read-only status of the first storage container is withdrawn and/or in response to a determination that the read-only status of the third storage container is withdrawn and/or in response to a determination that the read-write status of the second storage container is withdrawn, the first storage container may be set to the read-write status for the predetermined time period. During this period, the second storage container and the third storage container may be set to the read-only status. Thereafter, in response to a determination that the predetermined amount of time has elapsed, the third storage container may be set to the read-write status and the second storage container and the first storage container may be set to the read-only status, thereby completing a first redirect rotation in which each of the storage containers are set to the read-write status for a predetermined amount of time.

Based on each of the storage containers being rotationally set to the read-only status, in some approaches, and as a result of including management properties that cascade non-read data operations to the storage container set to the read-write status, an air gap copy is established between each of the storage containers. This air gap copy may be established as the specific storage container that the non-read data operations are redirected to, e.g., the storage container set to the read-write status, changes. This may be changed in one approach according predetermined time period expiring. More specifically, as designation of the read-write status is rotated through a plurality of the storage containers, a plurality of collections of data are established, e.g., pools of data. The techniques of method 400 may in some approaches be incorporated into data storage systems in which the average workload is repetitive. For example, assuming that the workload of such a system includes backing up data once a day, the redirect storage container may be changed each day. As a result, the pool of data of a given storage container is protected from being modified and/or deleted until the storage container is again set to the read-write status. Accordingly, testing may be performed on the data of each of the storage containers set to the read-only status without interrupting the workload of a data storage system, because data modifying and/or write operations are redirected to a storage container having the read-write status. This reduces downtime in data storage systems because, as described elsewhere herein, the option to test data of storage containers of a data storage system without causing an interruption in the workload of the system is not available in conventional data storage system and particularly conventional cloud based data storage systems. In sharp contrast, conventional data storage systems rely on performing snapshots. However, such snapshots are not feasible for enabling data testing on cloud based data storage systems, because they are relatively time consuming and costly. Accordingly, the inventive discoveries disclosed herein with regards to allowing only read based data operations to be performed on a plurality of storage containers while non-read data operations are redirected, e.g., cascaded, to at least one storage container set to a read-write status, proceed contrary to conventional wisdom.

Figure 6A:
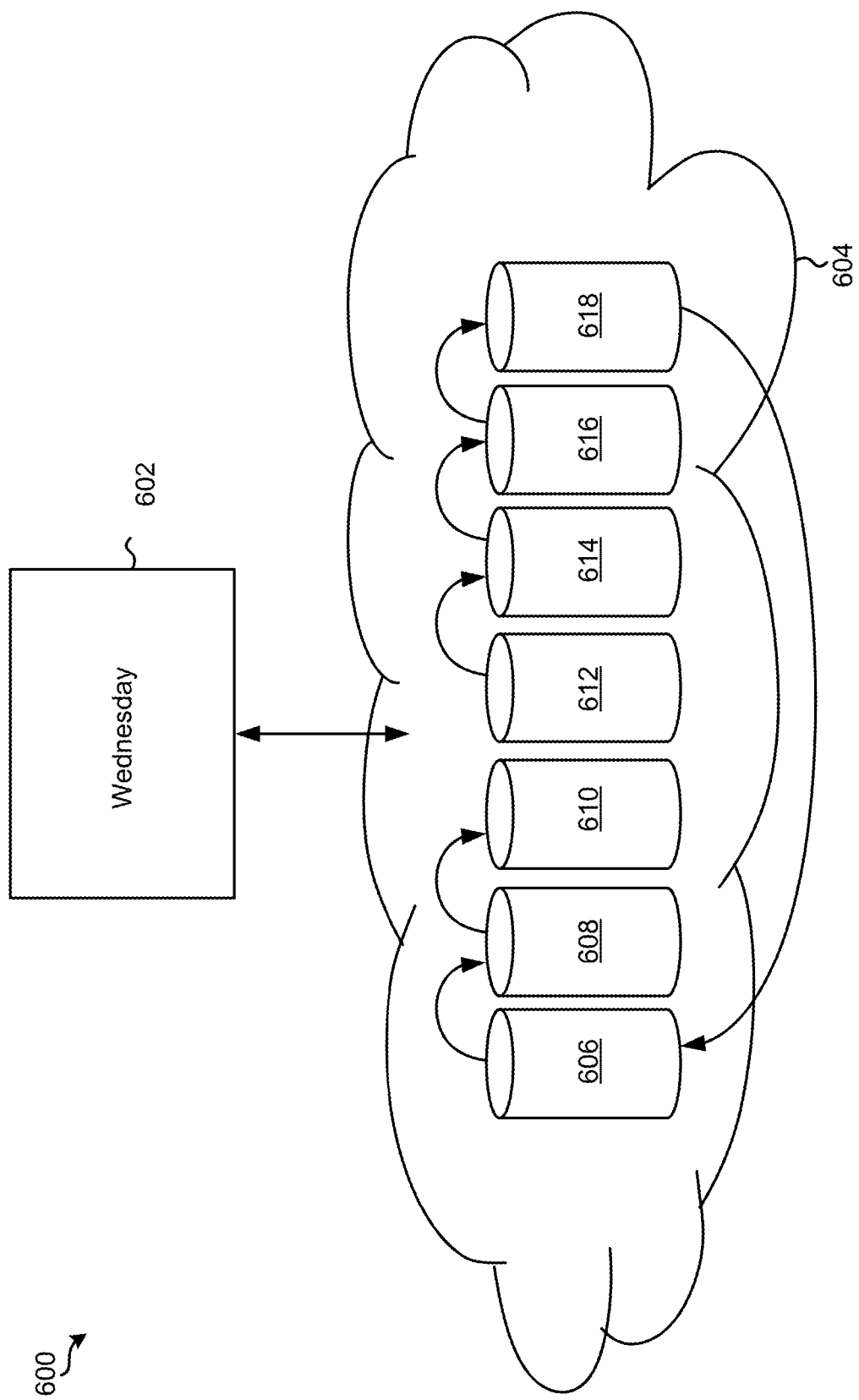
FIG. 6A is a data storage architecture, in accordance with one approach.

An illustrative example of a data storage environment including cascading redirect storage containers, e.g., storage pools, is shown in FIG. 6A.

FIG. 5A depicts a data storage architecture 500 and FIGS. 5B-5D depict a table 550 of data cataloged in the data storage architecture 500, in accordance with one approach. As an option, the present data storage architecture 500 and table 550 may be implemented in conjunction with features from any other approach listed herein, such as those described with reference to the other FIGS. Of course, however, such data storage architecture 500 and table 550 and others presented herein may be used in various applications and/or in permutations which may or may not be specifically described in the illustrative approaches listed herein. Further, the data storage architecture 500 and table 550 presented herein may be used in any desired environment.

Referring first to FIG. 5A, the data storage architecture 500 may include at least a first production system 502, although in some approaches a plurality of production systems may be present, e.g., see a second production system 504. Moreover, the data storage architecture 500 includes a DR test system 506. The first production system 502, the second production system 504 and/or the DR test system 506 may be in communication with a plurality of storage containers, e.g., see first storage container 508 and second storage container 510 of the storage location 512. It may be assumed that the first storage container is configured as a production storage container, while the second storage container is configured as a testing storage container. However, note that although the data storage architecture 500 only a single production storage container, e.g., the first storage container 508, and a single test storage container, e.g., the second storage container 510, some alternative approaches may include more than one production storage container, and each of such production vaults may be configured to redirect non-read data operations to a different test storage container during testing. For such testing, in some approaches, the second storage container 510 may include a modified copy of the data of the first storage container 508.

Requests to perform data operations on a first storage container may be received. It may be assumed that at least one of such data operations includes a "PUT" command that is initiated from the first production system 502 and specifies that version 1 of Data1 (Data1-v1) is to be "PUT" on the first storage container 508, e.g., the production storage container. The data operations may also include a second "PUT" command initiated by the second production system 504. The second "PUT" command may specify that data Data2v1 and Data3v1 are to be "PUT" on the first storage container 508.

The DR test system 506 may in one approach be a production system or in another approach be a new/temporary system dedicated as a DR test system. In either of such approaches, each of the production storage containers, e.g., the first storage container 508 and the second storage container 510, may be set to a DR test mode by providing a redirect pool that redirects all writes to a particular storage container. Note that during DR testing, the DR test system 506 is subject to the read-only status and thereby may not be allowed to perform modifying data operations on the first storage container 508 and the second storage container 510, while in contrast, the first production system 502 and the second production system 504 may be allowed to continue to perform modifying data operations, e.g., read operations, write operations, etc. In other words, only the DR test system 506 sees the containers as read-only in the DR test scenario. In contrast, in one or more approaches in which a legal hold is applied, where the systems 502, 504 are production systems, each of the systems 502, 504 are subject to the read-only status of the first storage container 508.

In some approaches the redirect pool may be enabled by setting data of the first storage container 508 to a read-only status, e.g., see "Read-Only" arrow extending between the first storage container 508 and the DR test system 506, and setting the second storage container 510 to a read-write status, e.g., see "Read-Write" arrow extending between the second storage container 510 and the DR test system 506. As will be further described elsewhere below, e.g., see FIGS. 5B-5D, a copy of a catalog of the first storage container 508 may be used for the duration of the test.

Subsequent to the DR test system 506 being established as a DR test system, the DR test system 506 may begin to read and write data without modifying any data in the first storage container 508.

Table 550 of FIG. 5B illustrates a state of a catalog, e.g., an initial catalog, prior to initiating the data testing. Specifically, table 550 of FIG. 5B, includes three data files, e.g., see Data1, Data2 and Data3, written to the storage location 512 by the first production system 502 and the second production system 504. States of the first storage container 508 and the second storage container 510 are also included in table 550 of FIG. 5B. For example, initially, the first storage container 508 is set to a READ-ONLY status, and the second storage container 510 is set to a READ-WRITE status. However, only the DR test system 506 views the catalog in such a way, because, as described elsewhere above, during DR testing, the DR test system 506 is subject to the read-only status, while in contrast, the first production system 502 and the second production system 504 may be allowed to continue to perform modifying data operations.

In one approach, DR testing in the data storage architecture 500 may begin with the following transactions from the DR test system 506:

GET Data1-v1

In this transaction, the Data1 may be read, e.g., read operations may be performed by the DR test system 506. It may be determined that "v1" is the relatively newest version of the data, and that such data is stored in the first storage container 508. Note that because the first storage container 508 is set to the READ-ONLY status, this data read operation may be performed as it does not alter a state of the data as a result.

MOD Data1-v2

This transaction includes the DR test system 506 requesting to append data to Data1. In some approaches, known techniques may be utilized to confirm that v1 is the relatively newest version of the data, and that the data is located in the first storage container 508. Such a confirmation may in one approach be performed by the DR test system 506. Based on the first storage container being set to the READ-ONLY status, and moreover based the second storage container 510 being set as the redirect storage container, e.g., based on the second storage container 510 being set to the READ-WRITE status, the appended data is written to the second storage container as version 2, e.g., see v2 of table 550 of FIG. 5C which illustrates an updated state of the catalog.

In FIG. 5C, DR various operations continue to be performed on the DR test system 506:

DELETE Data3-v1

In this transaction, one of the data operations includes a request to delete Data3-v1. Based on the first storage container 508 being set to the READ-ONLY status and including Data3-v1, the Data3-v1 may be recorded as delete-pending, but not deleted as the READ-ONLY status may never be withdrawn from the first storage container 508 in a DR Test scenario, and therefore the pending deletion is never carried out during its existence by the DR test system 506.

PUT Data7-v1

In this transaction, the Data7-v1 may be written to the second storage container 510, Data7-v1. Even if the properties of the Data7-v1 targets the first storage container 508, the Data7-v1 write may be redirected to write to the second storage container 510.

GET Data1-v2

In this transaction, a read is requested for Data1-v2. It may be determined that v2 is the newest version of the Data1-v2 and it is located in the second storage container 510. Data1-v2 may be read from the second storage container 510.

FIG. 5D illustrates a final catalog during the testing. A "Delete" operation targeting the second storage container 510 may trigger an actual delete of the data because the second storage container 510 is set to READ-WRITE.

It should be noted that allowing only read operations to be performed on the first data while the first storage container 508 is set to the read-only status and redirecting and/or postponing other data operations to the second storage container 510, enables testing to be performed on data of the first storage container 508 without interruptions being experienced in the data storage system that includes the first storage container. This is because non-read operations may be not allowed and/or postponed in a legal hold case from being incorporated on the first data until the read-only status is withdrawn. Additionally, the read-only state could never be lifted which still allows delete data operations to not fail yet keep the production data protected. Or in the case of DR testing, the non-read operations may not be allowed. In the meantime, testing may be performed on the first data and/or a copy of the first data without causing a loss of functionality in the storage system, e.g., as a result of non-read data operations being redirected to a redirect storage container, such as the second storage container 510. As mentioned elsewhere herein, during an entire DR test process, the production systems may be running as normal with no interruptions. Moreover, the production environment may be completely unaware of the DR test environment and any transactions being performed on the DR test system.

In some approaches, various techniques described in FIGS. 5A-5D may be applied for specific use cases. For example, in a legal hold use case, a state of data of a storage container may be preserved by applying a read-only status to the storage container. This preservation of the data may include ensuring that no data of the first storage container may, e.g., be manipulated, allowed to expire, amended, etc. Moreover, the data storage system is not interrupted based on non-read data operations being redirected to another storage container and/or postponed.

In a legal hold use case approach, data may be written to a cloud storage device from production application(s) or system(s). In response to determining that a predetermined event has occurred, e.g., such as a legal hold, a new cloud storage container may be created, and one or more production storage containers may be instructed to redirect data to the created storage container(s). This second storage container preferably also contains production data and is not expected to be deleted later except through natural data expiration.

Note that the legal hold case is similar to a DR testing case, except in some approaches the DR testing case may be applied directly on a production tape based storage device, while additional consideration may be applied regarding how to clean up once the legal hold situation is resolved, e.g., performing postponed data operations.

Upon a pool being set to redirect, in some approaches, data operations may be performed such that deletes on the original production storage container are marked as delete pending, but the deletes may be suspended and all write operations are redirected to the new storage container.

In response to a determination that a legal hold time period has passed, the original storage container may be set to a READ-WRITE status. At this point, postponed deletes may be performed and the system may begin writing all data directly in the original storage container, e.g., the storage container that was set to the read-only status during the testing. The location at which this data is written to, e.g., either the original storage container or the redirect storage container, may be recorded. Any data that is written to the previous redirect storage container may still be read from that storage container. Unless the properties of the data are modified to target the first storage container, new data writes may in some approaches not written to the first storage container even though the redirect storage container is still set to the READ-WRITE status. The original properties may still target the first storage container and, because the READ-ONLY status is withdrawn, data write may automatically be performed on the first storage container.

Note that over time, the redirect storage container may be emptied. Accordingly, the redirect storage container may be removed from a system or reused in a future workload.

FIG. 6A depicts a data storage architecture 600 and FIG. 6B depicts a table 650 of data cataloged in the data storage architecture 600, in accordance with one approach. As an option, the present data storage architecture 600 and table 650 may be implemented in conjunction with features from any other approach listed herein, such as those described with reference to the other FIGS. Of course, however, such data storage architecture 600 and table 650 and others presented herein may be used in various applications and/or in permutations which may or may not be specifically described in the illustrative approaches listed herein. Further, the data storage architecture 600 and table 650 presented herein may be used in any desired environment.

FIG. 6 includes cascading redirect storage containers for a PIT air gap copy use case. Configuring cascading redirect storage containers may be particularly effective for handling repetitive workloads that are performed on a time basis, e.g., such as doing backups once a day. Within a storage location 604, a storage container may be created for each day of the week to establish a seven day air gap in the data, e.g., see a first storage container 606, a second storage container 608, a third storage container 610, a fourth storage container 612, a fifth storage container 614, a sixth storage container 616 and a seventh storage container 618. In one approach, only one of the seven cloud vaults is configured to be written to on any given day. For example, in FIG. 6A, each of the first storage container 606, the second storage container 608, the fourth storage container 612, the fifth storage container 614, the sixth storage container 616 and the seventh storage container 618 may be set to a read-only status, while the third storage container is set to a read-write status. This ensures that a last 6 days of data is preserved. This also embeds an added degree of safekeeping within the data storage process, because non-read data operations are split across a plurality of storage containers, and as a result, the "user data" on the production container is not subject to being compromised and/or lost as a result of otherwise performing non-read data operations on the first storage container during optional testing. As indicated by the cascading arrows, each of the storage containers set to the read-only status are redirected to another unique storage container. However, based on a current day of the week being Wednesday, e.g., see a production system 602 indicating that it is Wednesday, the third storage container 610 does not have a redirect storage container, because it is the redirect storage container. More specifically, based on the configuration of the storage location 604, any data that is targeted to be written to the first storage container 606 is redirected to the second storage container 608. Because the second storage container is set to a READ-ONLY status, non-read data operations are redirect to the third storage container 610. In contrast, because the third storage container 610 is set to the READ-WRITE status, data operations are not redirected to another storage container from the third storage container 610, and instead are written thereto. Likewise, any data writes targeting the fourth storage container are redirected to the fifth storage container 614. The operations are from there redirected from the fifth storage container 614 to the sixth storage container 616, from the sixth storage container 616 to the seventh storage container 618, from the seventh storage container 618 to the first storage container 606, from the first storage container 606 to the second storage container 608, and finally to the third storage container 610. This results in all write data operations targeting the third storage container 610 on Wednesdays. This redirection configuration is illustrated in table 650.

Delete data operations that are postponed for the third storage container 610 may be performed on Wednesday based on the third storage container being set to the READ-WRITE status.

In response to a determination that it is Thursday, the READ-ONLY status of the third storage container 610 may be withdrawn, and the third storage container 610 may be set to the READ-ONLY status. Such a determination may be performed using known techniques such as assessing a calendar and/or monitoring a clock count. Moreover, the fourth storage container 612 may be set to the READ-WRITE status, and all other storage containers may be configured to redirect non-read data operations through the third storage container 610 to be performed on the fourth storage container 612. Any postponed delete operations that target the fourth storage container 612 may also be performed on the fourth storage container during the fourth storage container 612 being set to the READ-WRITE status. This sequence may continue throughout the week, and after Sunday the redirect vault returns back to the first storage container 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method comprising:
receiving requests to perform data operations on a first storage container, wherein the data operations include a read operation, a write operation and a command to delete first data stored on the first storage container;
determining whether the first data is set to a read-only status, wherein a copy of the first data is stored on a second storage container;
in response to a determination that the first data is set to the read-only status:
allowing the read operation to be performed on the first storage container for reading the first data,
performing the write operation on a second storage container, and
deleting the copy of the first data stored on the second storage container; and
in response to a determination that the read-only status has been withdrawn:
deleting the first data, and
allowing further write operations to be performed on the first storage container.

2. The computer-implemented method of claim 1, comprising: postponing deletion of the first data in response to a determination that the first data is set to the read-only status.

3. The computer-implemented method of claim 1, comprising: performing the write operation on the first storage container in response to a determination that the read-only status has been withdrawn.

4. The computer-implemented method of claim 1, comprising: performing disaster recovery testing on the first data while the first data is set to the read-only status.

5. The computer-implemented method of claim 1, comprising: setting the read-only status in response to receiving a command to comply with an order to preserve a current state of the first data for an audit that is scheduled to be performed on a cloud based storage system that includes the first storage container; and withdrawing the read-only status in response to receiving a command to lift the preservation of the current state of the first data.

6. The computer-implemented method of claim 1, comprising: storing information about the performed write operations in a log, wherein the log is a first catalog that is different than a second catalog that indicates the read-only status; migrating the information of the second catalog to the first catalog in response to a determination that the read-only status has been withdrawn; and using the information to associate data written during the write operation with the first data.

7. The computer-implemented method of claim 1, wherein the second storage container is a disaster recovery test vault on a cloud based storage system, wherein the read-only status is set for a period that disaster recovery testing is being performed on the first data.

8. The computer-implemented method of claim 1, wherein the second storage container is configured to be a redirect data repository while the first data is set to the read-only status.

9. A computer program product, the computer program product comprising a computer readable storage medium having program instructions embodied therewith, the program instructions readable and/or executable by a controller to cause the controller to:
receive, by the controller, requests to perform data operations on a first storage container, wherein the requested data operations include a read operation and a write operation;
determine, by the controller, whether first data stored on the first storage container is set to a read-only status; and
in response to a determination that the first data is set to the read-only status:
allow, by the controller, the read operation to be performed on the first storage container for reading the first data,
perform, by the controller, the write operation on a second storage container,
determine, by the controller, whether the read-only status has been withdrawn, and
allow, by the controller, further write operations to be performed on the first storage container and other further write operations to be performed on the second storage container in response to a determination that the read-only status has been withdrawn, wherein the other further write operations include a predetermined portion of data operations originally directed to be performed on the first storage container.

10. The computer program product of claim 9, wherein the requested data operations include a command to delete the first data, wherein a copy of the first data is stored on the second storage container, and comprising program instructions readable and/or executable by the controller to cause the controller to: delete, by the controller, the copy of the first data stored on the second storage container, wherein the copy of the first data is deleted while the first data is set to the read-only status; and delete, by the controller, the first data in response to a determination that the read-only status has been withdrawn.

11. The computer program product of claim 9, wherein the requested data operations include a command to delete some of the first data, and the program instructions readable and/or executable by the controller to: postpone, by the controller, deletion of the some of the first data in response to the determination that the first data is set to the read-only status; and delete, by the controller, the some of the first data in response to a determination that the read-only status has been withdrawn.

12. The computer program product of claim 9, the program instructions readable and/or executable by the controller to: perform, by the controller, the write operation on the first storage container in response to a determination that the read-only status has been withdrawn.

13. The computer program product of claim 9, wherein the read-only status is set for a period that disaster recovery testing is being performed on the first data.

14. The computer program product of claim 9, the program instructions readable and/or executable by the controller to: perform, by the controller, disaster recovery testing on the first data while the first data is set to the read-only status.

15. The computer program product of claim 9, the program instructions readable and/or executable by the controller to: set, by the controller, the read-only status in response to receiving a command to preserve a current state of the first data; and withdraw, by the controller, the read-only status in response to receiving a command to lift the preservation of the current state of the first data.

16. The computer program product of claim 9, the program instructions readable and/or executable by the controller to: store, by the controller, information about the performed write operations in a log; and use, by the controller, the information to associate data written during the write operation with the first data.

17. A system, comprising:
a processor; and
logic integrated with the processor, executable by the processor, or integrated with and executable by the processor, the logic being configured to:
receive requests to perform data operations on a first storage container, wherein the data operations include a read operation and a write operation, wherein the first storage container is a production cloud vault on a cloud based storage system;
determine whether first data stored on the first storage container is set to a read-only status; and
in response to a determination that the first data is set to the read-only status:
allow the read operation to be performed on the first storage container for reading the first data,
perform the write operation on a second storage container, wherein the second storage container is a disaster recovery test vault on the cloud based storage system, wherein the disaster recovery test vault is configured to be a redirect data repository while the first data is set to the read-only status,
determine whether the read-only status has been withdrawn, and
allow further write operations to be performed on the first storage container in response to a determination that the read-only status has been withdrawn.

18. The system of claim 17, wherein the data operations include a command to delete the first data, wherein a copy of the first data is stored on the second storage container, and comprising logic configured to: delete the copy of the first data stored on the second storage container, wherein the copy of the first data is deleted while the first data is set to the read-only status; and delete the first data in response to a determination that the read-only status has been withdrawn.

19. The system of claim 17, wherein the data operations include a command to delete some of the first data, and comprising logic configured to: postpone deletion of the some of the first data in response to the determination that the first data is set to the read-only status; and delete the some of the first data in response to a determination that the read-only status has been withdrawn.

20. The system of claim 17, comprising logic configured to: performing the write operation on the first storage container in response to a determination that the read-only status has been withdrawn.

21. The system of claim 17, wherein the read-only status is set for a period that disaster recovery testing is being performed on the first data.

22. A computer-implemented method, comprising:
receiving requests to perform data operations on a first storage container;
determining whether the first storage container is set to a read-only status;
in response to a determination that the first storage container is not set to the read-only status:
allowing read operations to be performed on data on the first storage container,
allowing write operations to be performed on the data on the first storage container, and
allowing delete operations to be performed on the data on the first storage container; and
in response to a determination that the first storage container is set to the read-only status:
allowing read operations to be performed on the data on the first storage container, and
performing write operations on a second storage container that is set to a read-write status, including performing write operations intended for the first storage container on the second storage container, and performing write operations intended for a third storage container on the second storage container,
wherein redirection of the write operations intended for the first storage container to be performed on the second storage container while the first storage container is set to the read-only status is based on a management property of the first storage container and a management property of the third storage container.

23. The computer-implemented method of claim 22, wherein the management property of the first storage container specifies that write operations intended for the first storage container be redirected to the third storage container while the first storage container is set to the read-only status, wherein the management property of the third storage container specifies that write operations intended for the third storage container be redirected to the second storage container while the third storage container is set to the read-only status.

24. The computer-implemented method of claim 22, comprising:
setting the first storage container to the read-only status for a predetermined time period;
withdrawing the read-only status on the first storage container in response to a determination that the predetermined time period has elapsed; and
setting the first storage container to the read-write status upon the read-only status being withdrawn from the first storage container, wherein the first storage container is set to the read-write status for the predetermined time period.

25. A computer-implemented method comprising:
receiving requests to perform data operations on a first storage container, wherein the data operations include a read operation and a write operation, wherein the first storage container is a production cloud vault on a cloud based storage system;
determining whether first data stored on the first storage container is set to a read-only status, wherein the read-only status is set for a period that disaster recovery testing is being performed on the first data; and
in response to a determination that the first data is set to the read-only status:
allowing the read operation to be performed on the first storage container for reading the first data,
performing the write operation on a second storage container, wherein the second storage container is a disaster recovery test vault on the cloud based storage system, wherein the disaster recovery test vault is configured to be a redirect data repository while the first data is set to the read-only status,
determining whether the read-only status has been withdrawn, and
allowing further write operations to be performed on the first storage container in response to a determination that the read-only status has been withdrawn.

* * * * *